United States Patent
Harsha et al.

(10) Patent No.: US 11,350,319 B2
(45) Date of Patent: May 31, 2022

(54) OPTIMIZED QUALITY OF SERVICE ENFORCEMENT FOR HANDOVER BETWEEN DIFFERENT RADIO ACCESS TYPES

(71) Applicant: Cisco Technology, Inc., San Jose, CA (US)

(72) Inventors: Sri Harsha, Bangalore (IN); Raghavendra Narayanappa, Karnataka (IN); Sandeep Dasgupta, Karnataka (IN); Ravi Sankar Mantha, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/000,579

(22) Filed: Aug. 24, 2020

(65) Prior Publication Data

US 2022/0060948 A1     Feb. 24, 2022

(51) Int. Cl.
*H04W 36/00*    (2009.01)
*H04W 28/02*    (2009.01)

(52) U.S. Cl.
CPC ... *H04W 36/0044* (2013.01); *H04W 28/0268* (2013.01); *H04W 36/0072* (2013.01)

(58) Field of Classification Search
CPC ......... H04W 28/0268; H04W 36/0044; H04W 36/0072
See application file for complete search history.

(56) References Cited

U.S. PATENT DOCUMENTS

| | | | |
|---|---|---|---|
| 10,524,166 B2 | 12/2019 | Youn et al. | |
| 2020/0015130 A1 | 1/2020 | Wang | |
| 2020/0077315 A1* | 3/2020 | Jin | H04W 36/14 |
| 2020/0112522 A1 | 4/2020 | Dannebro et al. | |

FOREIGN PATENT DOCUMENTS

| | | |
|---|---|---|
| WO | 2018232605 A1 | 12/2018 |
| WO | 2019077011 A1 | 4/2019 |

OTHER PUBLICATIONS

3GPP, "3rd Generation Partnership Project; Technical Specification Group Core Network and Terminals; 5G System Policy and Charging Control signalling flows and QoS parameter mapping; Stage 3 (Release 16)", 3GPP TS 29.513 V16.4.0 (Jun. 2020), 141 pages.

(Continued)

*Primary Examiner* — Khoa Huynh
(74) *Attorney, Agent, or Firm* — Edell, Shapiro & Finnan, LLC

(57) ABSTRACT

Techniques are described herein for optimizing Quality of Service (QoS) enforcement for handover between different Radio Access Types (RATs). In one example, during an initial user session establishment procedure involving a first RAT, one or more QoS parameters corresponding to a second RAT are obtained. The one or more QoS parameters corresponding to the second RAT are stored to generate one or more stored QoS parameters corresponding to the second RAT. During a handover procedure from the first RAT to the second RAT, the one or more stored QoS parameters corresponding to the second RAT are allocated.

20 Claims, 7 Drawing Sheets

700

710 — During an initial user session establishment procedure involving a first Radio Access Type (RAT), obtain one or more Quality of Service (QoS) parameters corresponding to a second RAT 720 — Store the one or more QoS parameters corresponding to the second RAT to generate one or more stored QoS parameters corresponding to the second RAT 730 — During a handover procedure from the first RAT to the second RAT, allocate the one or more stored QoS parameters corresponding to the second RAT

(56) References Cited

OTHER PUBLICATIONS

3GPP, 3rd Generation Partnership Project; Technical Specification Group Services and System Aspects; Procedures for the 5G System (5GS); Stage 2 (Release 16), 3GPP TS 23.502 V16.5.0 (Jul. 2020), 594 pages.

3GPP, 3rd Generation Partnership Project; Technical Specification Group Core Network and Terminals; Non-Access-Stratum (NAS) protocol for 5G System (5GS); Stage 3; (Release 16), 3GPP TS 24.501 V16.5.1 (Jul. 2020), 709 pages.

* cited by examiner

OPTIMIZED QUALITY OF SERVICE ENFORCEMENT FOR HANDOVER BETWEEN DIFFERENT RADIO ACCESS TYPES

TECHNICAL FIELD

The present disclosure relates to telecommunications technology.

BACKGROUND

The introduction of New Radio (NR) technology as part of fifth-generation (5G) standards has opened avenues for high-bandwidth and low-latency communication. 5G mobile communication networks can cater to high-bandwidth/content-rich applications such as ultra High-Definition (e.g., 4K) video streaming, real-time multi-player network gaming, virtual reality applications, etc.

DESCRIPTION OF EXAMPLE EMBODIMENTS

Overview

Techniques are presented for optimizing Quality of Service (QoS) enforcement for handover between different Radio Access Types (RATs). In one example, during an initial user session establishment procedure involving a first RAT, one or more QoS parameters corresponding to a second RAT are obtained. The one or more QoS parameters corresponding to the second RAT are stored to generate one or more stored QoS parameters corresponding to the second RAT. During a handover procedure from the first RAT to the second RAT, the one or more stored QoS parameters corresponding to the second RAT are allocated.

Example Embodiments

Figure 1:
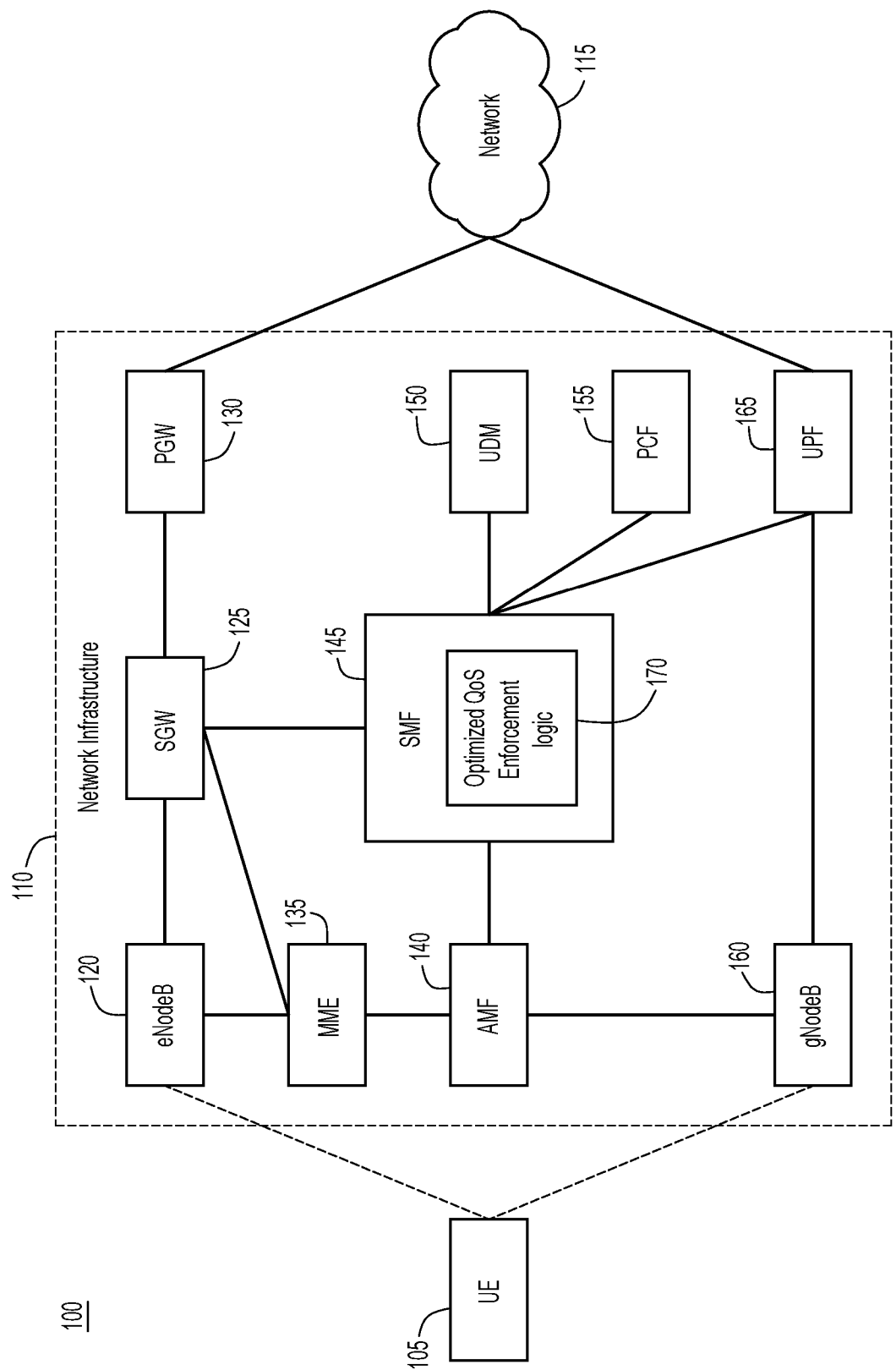
FIG. 1 illustrates a block diagram of a system configured for optimized Quality of Service (QoS) enforcement for handovers between different Radio Access Types (RATs), according to an example embodiment.

FIG. 1 illustrates a block diagram of an example system 100 configured for optimized Quality of Service (QoS) enforcement for handovers between different Radio Access Types (RATs). System 100 includes User Equipment (UE) 105 (e.g., a mobile phone), network infrastructure 110, and network 115 (e.g., the Internet). Network infrastructure 110 may include both fourth-generation (4G) and fifth-generation (5G) telecommunication entities. The 4G telecommunication entities include evolved node B (eNodeB) 120, Serving Gateway (SGW) 125, Packet Data Network (PDN) Gateway (PGW) 130, and Mobility Management Entity (MME) 135. The 5G entities include Access and Mobility Management Function (AMF) 140, Session Management Function (SMF) 145, Unified Data Management (UDM) 150, Policy Charging Function (PCF) 155, next-generation node B (gNodeB) 160, and User Plane Function (UPF) 165.

Control and User Plane Separation (CUPS) is a technology that enables separation of one or more SGWs and PGWs into a control plane and a user plane. Thus, for example, CUPS may effectuate separation of SGW 125 into a User plane SGW (SGW-U) and a Control plane SGW (SGW-C), and PGW 130 into a User plane PGW (PGW-U) and a Control plane PGW (PGW-C). MME 135, the SGW-C, and the PGW-C may comprise a 4G control plane, and AMF 140, SMF 145, UDM 150, and PCF 155 may comprise a 5G control plane. eNodeB 120, the SGW-U, and the PGW-U, may comprise a 4G data plane, and gNodeB 160 and UPF 165 may comprise a 5G data plane. It will be appreciated that the network entities depicted in system 100 may be rearranged/co-located in any suitable manner. For instance, in one specific example, SMF 145 may be co-located with the PGW-C, and UPF 165 may be co-located with the PGW-U. Other embodiments may be envisioned.

To help manage network communications between UE 105 and network 115, resources (e.g., bandwidth) may be reserved at various reference points in system 100. For example, SMF 145 may be configured to allocate resources for data messages for the air interface between UE 105 and gNodeB 160, the interface between gNodeB 160 and UPF 165, and the interface between UPF 165 and network 115. SMF 145 may also be configured to similarly allocate resources for interfaces between one or more 4G entities.

eNodeB 120 and gNodeB 160 comprise Radio Access Networks (RANs) of differing Radio Access Types (RATs) (e.g., 4G and 5G, respectively). Handover procedures may help UE 105 move between different RANs (e.g., from eNodeB 120 to gNodeB 160, or from gNodeB 160 to eNodeB 120). However, conventional handover procedures require excessive signaling to ensure that the appropriate resource parameters are being enforced according to the relevant RAT.

For example, during a conventional handover from gNodeB 160 to eNodeB 120, SMF 145 would provide 5G Quality of Service (QoS) parameters (e.g., bandwidth parameters) to eNodeB 120, since only the 5G QoS parameters are provisioned from PCF 155 to SMF 145 during the initial Protocol Data Unit (PDU) session establishment. However, because 5G is capable of supporting rates of up to 20 Gbps, but eNodeB 120 can only handling a maximum theoretical bandwidth of 4 Gbps, the 5G QoS parameters may be greater than what eNodeB 120 can handle.

In this case, eNodeB 120 would reject the 5G QoS parameters obtained during the handover, thus prompting the aforementioned excessive signaling. In particular, in order to allocate the appropriate 4G QoS parameters to eNodeB 120, SMF 145 would need to report the flow failure to UPF 165, so that UPF 165 could remove those flows, and inform PCF 155 of the RAT change and fetch 4G QoS parameters for eNodeB 120. SMF 145 would then pass on the 4G QoS flow parameters to eNodeB 120 and, upon obtaining a notification from eNodeB 120 that the 4G QoS parameters were successfully allocated, inform UPF 165 to create flows in accordance with the 4G QoS parameters that were accepted by eNodeB 120.

This excessive signaling can create an additional signaling burden on all the entities involved in session creation/modification/transfer. Furthermore, the conventional flow failure and QoS realignment procedure can result in a temporary data flow loss, thereby causing buffering of an application/video, intermittent loss of data, and negative impact on user satisfaction. If the application is intolerant of delays such as telemedicine/real-time communication, this can lead to catastrophic results.

Similar issues exist with respect to conventional handovers from eNodeB 120 to gNodeB 160. During such a handover, SMF 145 would provide 4G QoS parameters (e.g., bandwidth parameters) to eNodeB 120, since only the 4G QoS parameters are provisioned from PCF 155 to SMF 145 during the initial PDN connection establishment. In this case, a 5G PDU session may be established with the 4G QoS parameters, but this would involve serving the user with mediocre 4G bandwidth even though gNodeB 160 is capable of handling a higher bandwidth and catering to a better user experience.

Furthermore, after the user establishes the successful 5G PDU session with 4G QoS flows, SMF 145 informs PCF 155 of the RAT change, and PCF 155 triggers a QoS modification suitable for 5G flows with a higher bandwidth better suited for the relevant application(s). The 5G QoS parameters exchanged between PCF 155 and SMF 145 comprises excessive signaling in the form of a message exchange across network elements, thereby creating an unnecessary signaling burden.

Therefore, conventional handovers between different RATs require excessive signaling and have other issues as discussed above. Accordingly, in order to minimize signaling, avoid unnecessary failure scenarios, and address other issues, optimized QoS enforcement logic 170 is provided in SMF 145. Briefly, optimized QoS enforcement logic 170 may cause SMF 145 to automatically provision QoS enforcement during handover procedures. SMF 145 may obtain, during an initial user session establishment procedure involving a first RAT, one or more QoS parameters (e.g., bandwidth) corresponding to a second RAT. SMF 145 may further store the one or more QoS parameters corresponding to the second RAT to generate one or more stored QoS parameters corresponding to the second RAT, and, during a handover procedure from the first RAT to the second RAT, allocate the one or more stored QoS parameters corresponding to the second RAT. This helps serve users to fullest capability of the network in which the user establishes a session in addition to automatic enforcement of QoS to the appropriate RAT. It will be appreciated that these techniques may apply to any suitable RAT.

In one example, the first RAT may include 4G telecommunications technology, and the second RAT may include 5G telecommunications technology. For instance, SMF 145 may obtain, during an initial user session establishment procedure involving 4G telecommunications technology (e.g., a PDN connection establishment procedure), one or more QoS parameters corresponding to the 5G telecommunications technology. SMF 145 may further store the one or more QoS parameters corresponding to the 5G telecommunications technology to generate one or more stored QoS parameters corresponding to the 5G telecommunications technology, and, during a handover procedure from the 4G telecommunications technology (e.g., eNodeB 120) to the 5G telecommunications technology (e.g., gNodeB 160), allocate the one or more stored QoS parameters corresponding to the 5G telecommunications technology.

In another example, the first RAT may include 5G telecommunications technology, and the second RAT may include 4G telecommunications technology. For instance, SMF 145 may obtain, during an initial user session establishment procedure involving the 5G telecommunications technology (e.g., a PDU session establishment procedure), one or more QoS parameters corresponding to the 4G telecommunications technology. SMF 145 may further store the one or more QoS parameters corresponding to the 4G telecommunications technology to generate one or more stored QoS parameters corresponding to the 4G telecommunications technology, and, during a handover procedure from the 5G telecommunications technology (e.g., gNodeB 160) to the 4G telecommunications technology (e.g., eNodeB 120), allocate the one or more stored QoS parameters corresponding to the 4G telecommunications technology.

Figure 2:
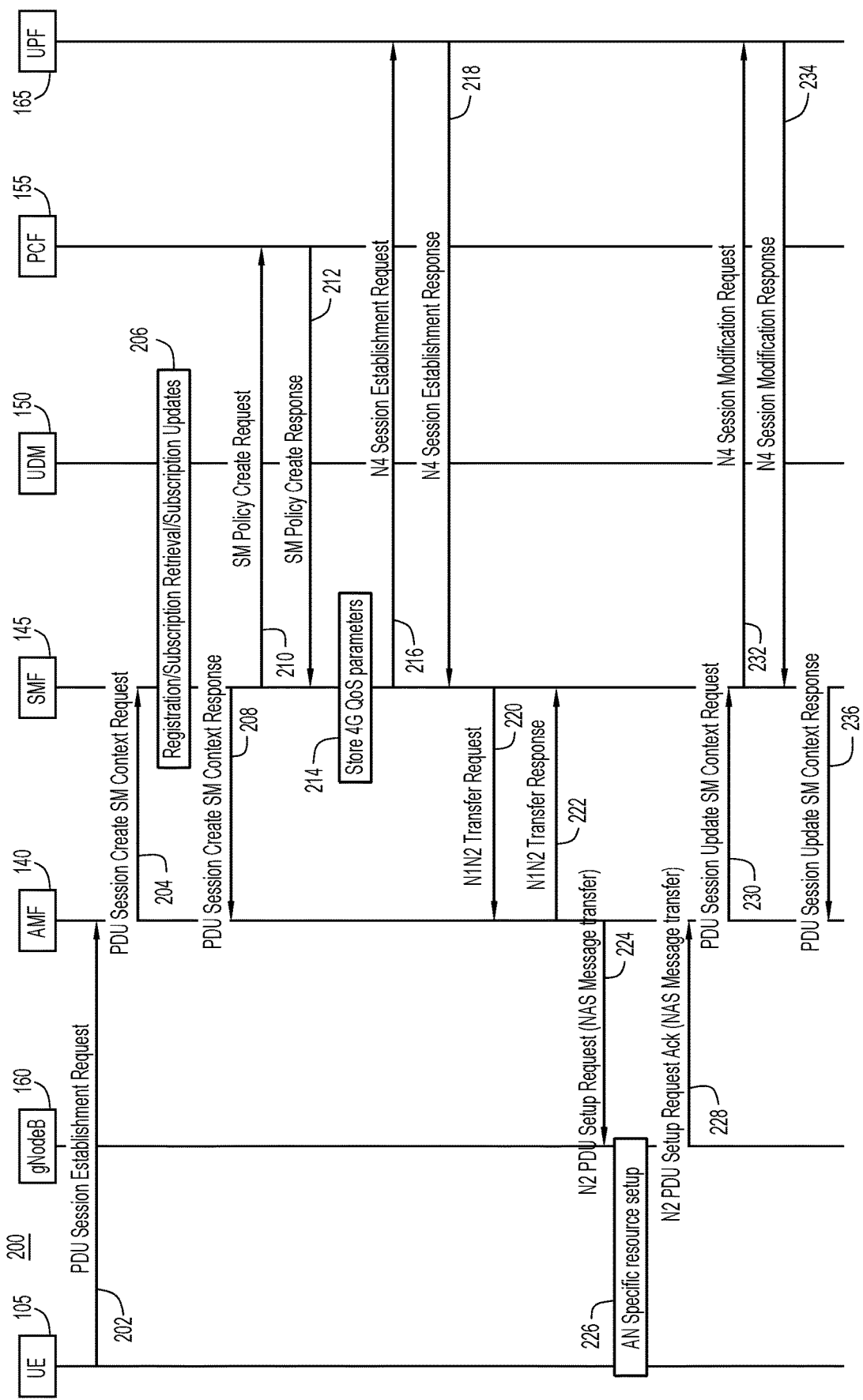
FIG. 2 illustrates a call flow diagram of a method for establishing a fifth generation (5G) Protocol Data Unit (PDU) session, according to an example embodiment.

FIG. 2 illustrates a call flow diagram of an example method 200 for establishing a 5G PDU session. At operation 202, AMF 140 obtains a PDU session establishment request from UE 105. At operation 204, SMF 145 obtains, from AMF 140, an indication of an initial user session establishment procedure (e.g., an indication that UE 105 has requested establishment of the PDU session, such as a PDU session create Session Management (SM) context request). At operation 206, SMF 145 interacts with UDM 150 to implement subscription-related procedures, such as registration, subscription retrieval, and/or subscription updates. In one example, SMF 145 may provide, to UDM 150, a request for subscription information associated with UE 105. In response to providing the request for the subscription information, SMF 145 may obtain the subscription information from UDM 150. In one example, the subscription information fetched from UDM 150 may indicate that UE 105 is permitted to access both 4G and 5G telecommunications technology and can participate in a 5G-to-4G handover. The subscription information permits QoS parameters to be specified on a per-user basis. At operation 208, SMF 145 provides, to AMF 140, a PDU session create SM context response.

At operation 210, in response to obtaining the indication of the initial user session establishment procedure and based on the subscription information, SMF 145 requests, from PCF 155, one or more QoS parameters corresponding to 4G telecommunications technology. In one example, the request may be included (e.g., embedded) in an SM policy create request. Conventionally, SMF 145 would not request the one or more QoS parameters corresponding to 4G telecommunications technology because the initial user session being established is a 5G PDU session. In one example, SMF 145 also requests one or more QoS parameters corresponding to the 5G telecommunications technology to enable the 5G PDU session to be established.

At operation 212, during the initial user session establishment procedure involving the 5G telecommunications technology, SMF 145 obtains, from PCF 155, the one or more QoS parameters corresponding to the 4G telecommunications technology. In one example, the one or more QoS parameters corresponding to the 4G telecommunications technology may be included (e.g., embedded) in an SM policy create response. Conventionally, SMF 145 would not obtain the one or more QoS parameters corresponding to 4G telecommunications technology because the initial user session being established is a 5G PDU session. SMF 145 may also obtain, from PCF 155, the one or more QoS parameters corresponding to the 5G telecommunications technology. PCF 155 may obtain/maintain information regarding the QoS parameters in any suitable manner. For example, the QoS parameters may be preprogrammed into PCF 155, or an application server behind PCF 155 may supply policies to PCF 155 dynamically. In any case, SMF 145 may obtain per-RAT QoS parameters from PCF 155 during policy session creation or modification and the SM policy association may be established.

At operation 214, SMF 145 stores the one or more QoS parameters corresponding to the 4G telecommunications technology to generate one or more stored QoS parameters corresponding to the 4G telecommunications technology. At operation 216, SMF 145 allocates the one or more QoS parameters corresponding to the 5G telecommunications technology. In one example, SMF 145 provides, to UPF 165, the one or more QoS parameters corresponding to the 5G telecommunications technology. The one or more QoS parameters corresponding to the 5G telecommunications technology may be included (e.g., embedded) in an N4 session establishment request. At operation 218, SMF 145 obtains, from UPF 165, an N4 session establishment response.

SMF 145 may also interact with AMF 140 to communicate policy/5G QoS parameters to AMF 140 and gNodeB 160. In particular, at operation 220, SMF 145 further allocates the one or more QoS parameters corresponding to the 5G telecommunications technology. In one example, SMF 145 provides, to AMF 140, the one or more QoS parameters corresponding to the 5G telecommunications technology. The one or more QoS parameters corresponding to the 5G telecommunications technology may be included (e.g., embedded) in an N1N2 transfer request. At operation 222, SMF 145 obtains, from AMF 140, an N1N2 transfer response.

At operation 224, AMF 140 provides, to gNodeB 160, the one or more QoS parameters corresponding to the 5G telecommunications technology. The one or more QoS parameters corresponding to the 5G telecommunications technology may be included (e.g., embedded) in an N2 PDU setup request (e.g., an N2 payload including RAN resource related information). Non-Access Stratum (NAS) parameters may be separately passed to UE 105 via gNodeB 160 in a PDU establishment accept message. At operation 226, gNodeB 160 performs an AN-specific resource setup with UE 105. At operation 228, AMF 140 obtains, from gNodeB 160, an N2 PDU setup request acknowledgment (e.g., NAS message transfer) indicating successful establishment. Thus, SMF 145 may allocate the one or more parameters corresponding to the 5G telecommunications technology by providing (directly or indirectly) the one or more parameters corresponding to the 5G telecommunications technology to one or more network entities comprising a data plane (e.g., UPF 165 and gNodeB 160).

At operation 230, SMF 145 obtains, from AMF 140, a PDU session update SM context request. At operation 232, SMF 145 provides, to UPF 165, an N4 session modification request. At operation 234, SMF 145 obtains, from UPF 165, an N4 session modification response. At operation 236, SMF 145 provides, to AMF 140, a PDU session update SM context response.

Figure 3:
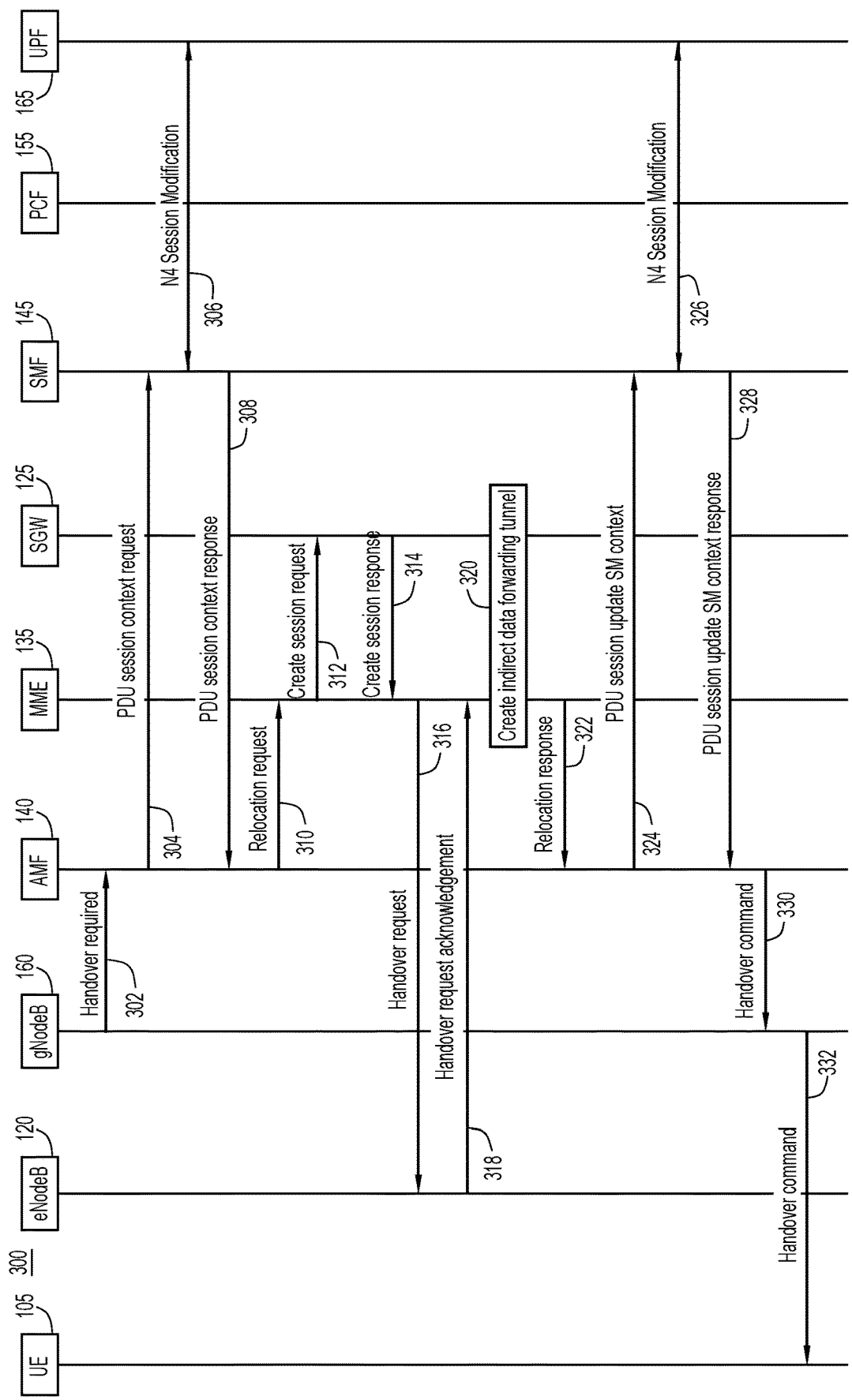
FIG. 3 illustrates a call flow diagram of a method for implementing a handover from a 5G next generation Node B (gNodeB) to a fourth generation (4G) evolved Node B (eNodeB), according to an example embodiment.

FIG. 3 illustrates a call flow diagram of an example method 300 for implementing a handover from gNodeB 160 (5G telecommunications technology) to eNodeB 120 (4G telecommunications technology). Method 300 may occur after method 200, that is, after the initial 5G PDU session has been successfully established and SMF 145 stores the one or more QoS parameters corresponding to the 4G telecommunications technology. At operation 302, gNodeB 160 determines that a handover is required and AMF 140 obtains an indication from gNodeB 160 that the handover is required. At operation 304, SMF 145 obtains a request for the one or more stored QoS parameters corresponding to the 4G telecommunications technology (e.g., a PDU session context request).

At operation 306, SMF 145 and UPF 165 may exchange N4 session modification messages. At operation 308, during the handover procedure from the 5G telecommunications technology to the 4G telecommunications technology, SMF 145 allocates the one or more stored QoS parameters corresponding to the 4G telecommunications technology. For example, SMF 145 may provide, to AMF 140, the one or more stored QoS parameters corresponding to the 4G telecommunications technology. The one or more stored QoS parameters corresponding to the 4G telecommunications technology may be included (e.g., embedded) in a PDU session context response. SMF 145 may also provide other context to AMF 140 through this PDU session context procedure. Conventionally, SMF 145 would not store the one or more QoS parameters corresponding to the 4G telecommunications technology, and as such would provide the one or more QoS parameters corresponding to the 5G telecommunications technology instead of the one or more stored QoS parameters corresponding to the 4G telecommunications technology.

At operation 310, AMF 140 provides, to MME 135, the one or more stored QoS parameters corresponding to the 4G telecommunications technology. The one or more stored QoS parameters corresponding to the 4G telecommunications technology may be included (e.g., embedded) in a relocation request. At operation 312, MME 135 provides a create session request to SGW 125. At operation 314, MME 135 obtains a create session response from SGW 125. At operation 316, MME 135 provides, to eNodeB 120, the one or more stored QoS parameters corresponding to the 4G telecommunications technology. The one or more stored QoS parameters corresponding to the 4G telecommunications technology may be included (e.g., embedded) in a handover request.

At operation 318, eNodeB 120 provides, to MME 135, an indication that eNodeB 120 has successfully accepted the one or more stored QoS parameters corresponding to the 4G telecommunications technology. Conventionally, MME 135 would provide the one or more QoS parameters corresponding to the 5G telecommunications technology, and eNodeB 120 would reject the one or more QoS parameters corresponding to the 5G telecommunications technology because eNodeB 120 is not capable of handling 5G bandwidth rates. System 100 would then derive 4G QoS parameters from the one or more QoS parameters corresponding to the 5G telecommunications technology and allocate the 4G QoS parameters only after eNodeB 120 rejects the one or more QoS parameters corresponding to the 5G telecommunications technology. This would require the excessive signaling and prompt temporary data flow loss as discussed above. The techniques described herein may avoid these issues because eNodeB 120 successfully accepts the one or more stored QoS parameters corresponding to the 4G telecommunications technology at operation 318.

At operation 320, an indirect data forwarding tunnel is created between MME 135 and SGW 125. At operation 322, MME 135 provides a relocation response to AMF 140. At operation 324, SMF 145 obtains, from AMF 140, an indication that eNodeB 120 successfully accepted the one or more stored QoS parameters corresponding to the 4G telecommunications technology. The indication may be included in a PDU session update SM context message. At operation 326, during the handover procedure from the 5G telecommunications technology to the 4G telecommunications technology, SMF 145 further allocates the one or more stored QoS parameters corresponding to the 4G telecommunications technology. For example, SMF 145 may provide the one or more stored QoS parameters corresponding to the 4G telecommunications technology to UPF 165. The one or more stored QoS parameters corresponding to the 4G telecommunications technology may be included (e.g., embedded) in an N4 session modification message. This signaling toward UPF 165 may be optimized whereby SMF 145 may send both data path and QoS updates in the same Packet Forwarding Control Protocol (PFCP) session update request/response exchange. SMF 145 may thus inform UPF 165 of the change in the QoS parameters to effectuate a successful modification of 4G QoS enforcement.

At operation 328, SMF 145 provides a PDU session update SM context response to AMF 140. Thus, SMF 145 may allocate the one or more stored parameters corresponding to the 4G telecommunications technology by providing (directly or indirectly) the one or more stored parameters corresponding to the 4G telecommunications technology to one or more network entities comprising a data plane (e.g., SGW 125 and eNodeB 120). At operation 330, AMF 140 provides a handover command to gNodeB 160. At operation 332, gNodeB 160 provides the handover command to UE 105. Any remaining operations may be successfully and efficiently performed.

Thus, as illustrated in FIGS. 2 and 3, SMF 145 may fetch 4G QoS flow parameters during 5G PDU session establishment and store them for use during a 5G-to-4G handover. In one example, SMF 145 may communicate with PCF 155 during PDU session establishment (e.g., during policy context creation) and acquire authorized rules and 4G QoS flow descriptions that include details regarding an amount of resources to be allocated to support the underlying applications. SMF 145 may subsequently send this information to gNodeB 160 over the N2 interface via AMF 140, and to UE 105 over the N1 interface also via AMF 140. SMF 145 may provide the mapped Evolved Packet System (EPS) bearer context to UE 105 to assist UE 105 in moving from gNodeB 160 (5G) to eNodeB 120 (4G). The mapped EPS bearer context may be sent in the form of N1 content that includes the 4G QoS flow parameters to ensure that UE 105 has the proper QoS during the 5G-to-4G handover. As a result, the handover from gNodeB 160 to eNodeB 120 may succeed using acceptable QoS parameters for 4G radio capabilities to enforce the appropriate QoS.

Figure 4:
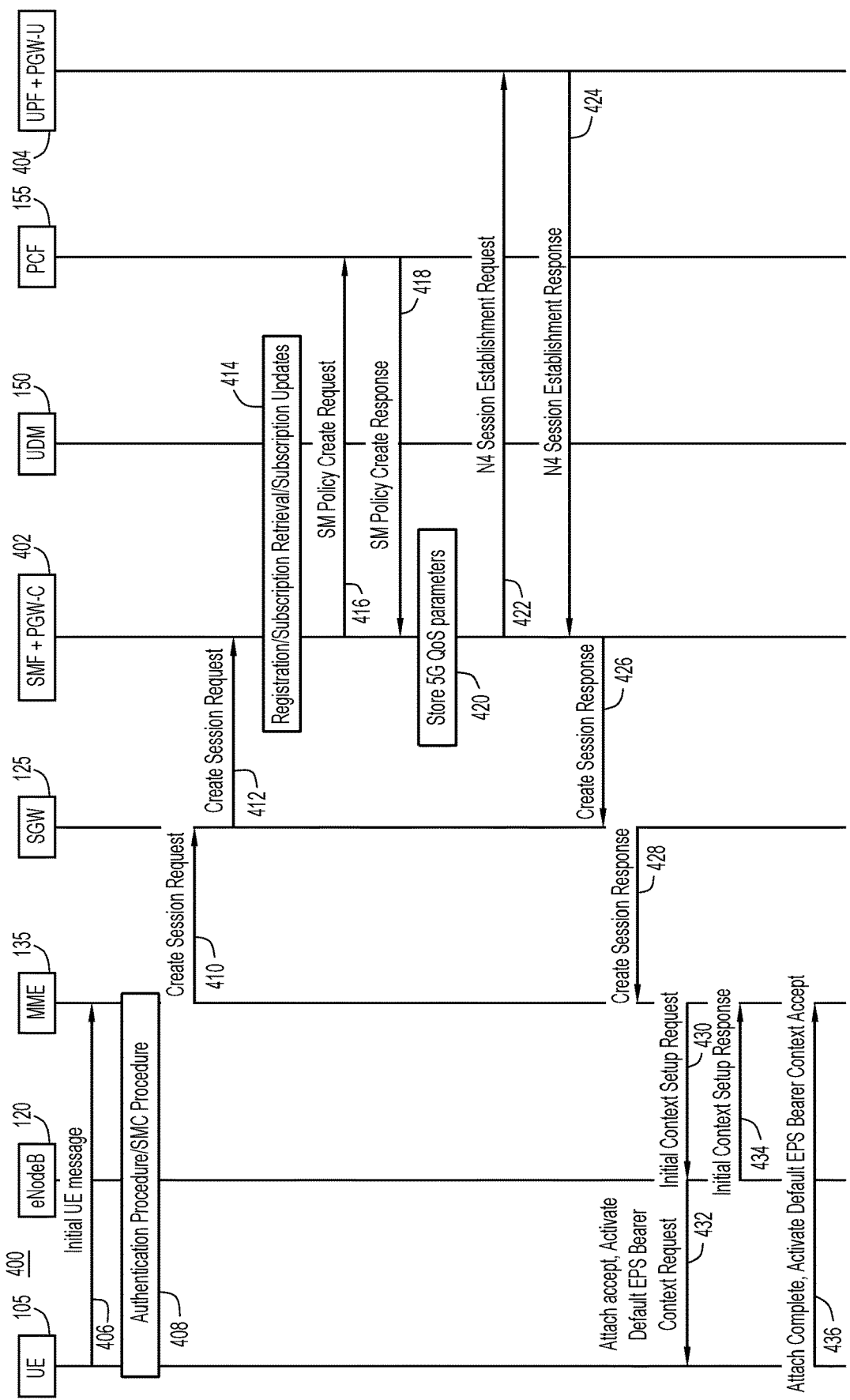
FIG. 4 illustrates a call flow diagram of a method for establishing a 4G Protocol Data Network (PDN) connection, according to an example embodiment.

FIG. 4 illustrates a call flow diagram of an example method 400 for establishing a 4G PDN connection. Method 400 involves a co-located SMF and PGW-C (SMF+PGW-C) 402 and a co-located UPF and PGW-U (UPF+PGW-U) 404. At operation 406, MME 135 obtains an initial UE message from UE 105. The initial UE message may include an attach request and a request to activate PDN connectivity. At operation 408, MME 135 and UE 105 may participate in an authentication procedure and a Security Mode Command (SMC) procedure.

At operation 410, MME 135 provides a create session request to SGW 125. At operation 412, SMF+PGW-C 402 obtains, from SGW 125, an indication of an initial user session establishment procedure (e.g., an indication that UE 105 has requested establishment of the PDN connection, such as the create session request). At operation 414, SMF+PGW-C 402 interacts with UDM 150 to implement subscription-related procedures, such as registration, subscription retrieval, and/or subscription updates. In one example, SMF+PGW-C 402 may provide, to UDM 150, a request for subscription information associated with UE 105. In response to providing the request for the subscription information, SMF+PGW-C 402 may obtain the subscription information from UDM 150. In one example, the subscription information fetched from UDM 150 may indicate that UE 105 is permitted to access both 4G and 5G telecommunications technology and can participate in a 4G-to-5G handover. The subscription information permits QoS parameters to be specified on a per-user basis, rather than using a single mapping between 4G QoS parameters and 5G QoS parameters for all sessions as would be required conventionally.

At operation 416, in response to obtaining the indication of the initial user session establishment procedure and based on the subscription information, SMF+PGW-C 402 requests, from PCF 155, one or more QoS parameters corresponding to 5G telecommunications technology. In one example, the request may be included (e.g., embedded) in an SM policy create request. Conventionally, SMF+PGW-C 402 would not request the one or more QoS parameters corresponding to 5G telecommunications technology because the initial user session being established is a 4G PDN connection. SMF+PGW-C 402 may also request one or more QoS parameters corresponding to the 4G telecommunications technology to enable the 4G PDN connection to be established.

At operation 418, during the initial user session establishment procedure involving the 4G telecommunications technology, SMF+PGW-C 402 obtains, from PCF 155, the one or more QoS parameters corresponding to the 5G telecommunications technology. In one example, the one or more QoS parameters corresponding to the 5G telecommunications technology may be included (e.g., embedded) in an SM policy create response. Conventionally, SMF+PGW-C 402 would not obtain the one or more QoS parameters corresponding to 5G telecommunications technology because the initial user session being established is a 4G PDN connection. SMF+PGW-C 402 may also obtain, from PCF 155, the one or more QoS parameters corresponding to the 4G telecommunications technology. PCF 155 may obtain/maintain information regarding the QoS parameters in any suitable manner. For example, the QoS parameters may be preprogrammed into PCF 155, or an application server behind PCF 155 may supply policies to PCF 155 dynamically. In any case, SMF+PGW-C 402 may obtain per-RAT QoS parameters from PCF 155 during policy session creation or modification and the SM policy association may be established.

At operation 420, SMF+PGW-C 402 stores the one or more QoS parameters corresponding to the 5G telecommunications technology to generate one or more stored QoS parameters corresponding to the 5G telecommunications technology. At operation 422, SMF+PGW-C 402 allocates the one or more QoS parameters corresponding to the 4G telecommunications technology. In one example, SMF+PGW-C 402 provides, to UPF+PGW-U 404, the one or more QoS parameters corresponding to the 4G telecommunications technology. The one or more QoS parameters corresponding to the 4G telecommunications technology may be included (e.g., embedded) in an N4 session establishment request. At operation 424, SMF+PGW-C 402 obtains, from UPF+PGW-U 404, an N4 session establishment response.

SMF 145 may also interact with MME 135 to communicate policy/4G QoS parameters to MME 135 and eNodeB 120. In particular, at operation 426, SMF+PGW-C 402 further allocates the one or more QoS parameters corresponding to the 5G telecommunications technology. In one example, SMF+PGW-C 402 provides, to SGW 125, the one or more QoS parameters corresponding to the 4G telecommunications technology. The one or more QoS parameters corresponding to the 4G telecommunications technology may be included (e.g., embedded) in a create session response. At operation 428, MME 135 obtains, from SGW 125, the one or more QoS parameters corresponding to the 4G telecommunications technology (e.g., included/embedded in the create session response).

At operation 430, MME 135 provides, to eNodeB 120, the one or more QoS parameters corresponding to the 4G telecommunications technology. The one or more QoS parameters corresponding to the 4G telecommunications technology may be included (e.g., embedded) in an initial context setup request. MME 135 may further provide attach accept and activate default EPS bearer context request message(s) to eNodeB 120. At operation 432, eNodeB 120 provides the attach accept and activate default EPS bearer context request message(s) to UE 105. At operation 434, MME 135 obtains, from eNodeB 120, an initial context setup response indicating successful establishment. At operation 436, MME 135 obtains, from UE 105, attach complete and activate default EPS bearer context accept message(s). Thus, SMF 145 may allocate the one or more parameters corresponding to the 4G telecommunications technology by providing (directly or indirectly) the one or more parameters corresponding to the 4G telecommunications technology to one or more network entities comprising a data plane (e.g., UPF+PGW-U 404 and eNodeB 120). As such, the PDN connection is successfully established in EPS with the one or more QoS parameters corresponding to the 4G telecommunications technology.

Figure 5:
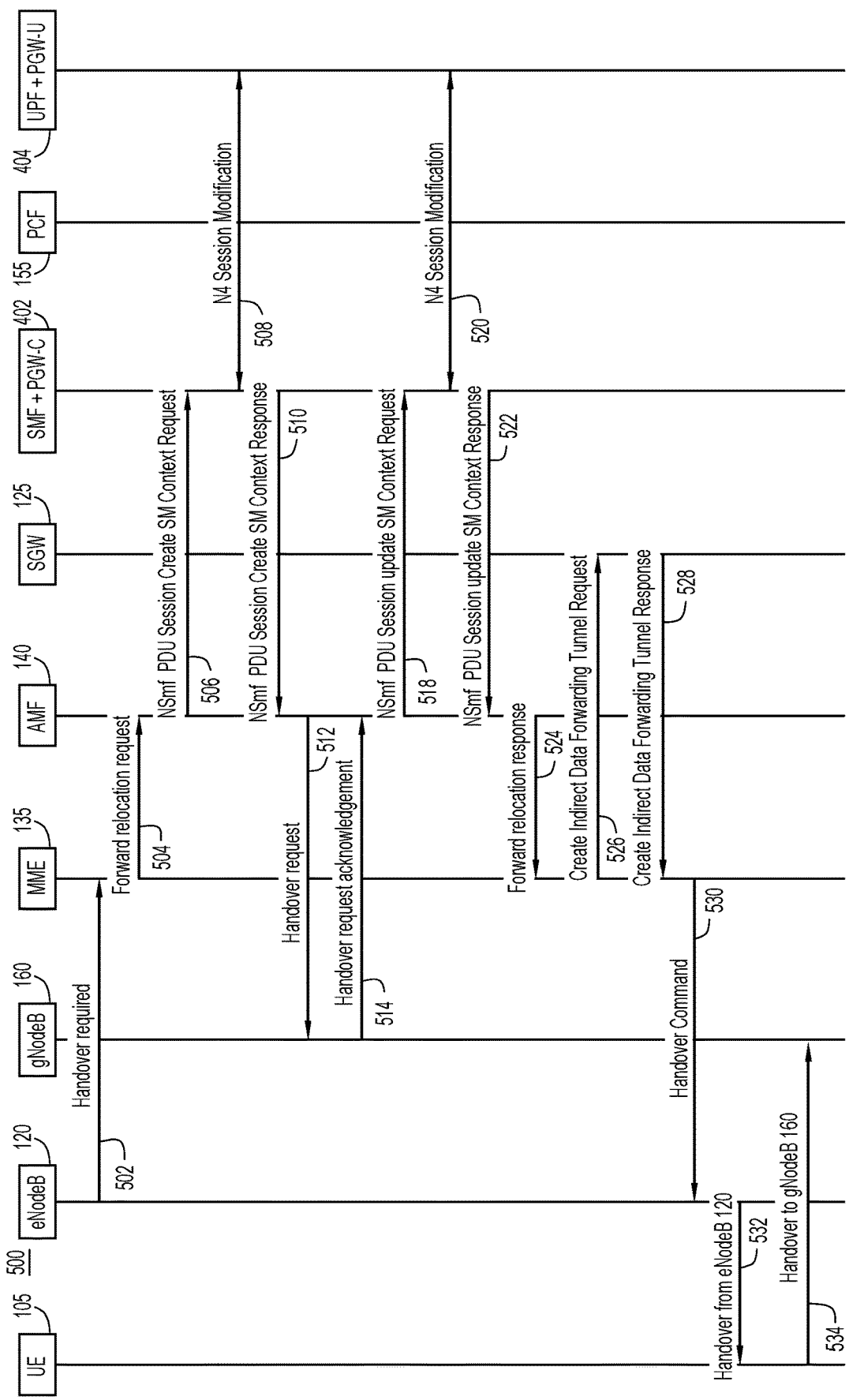
FIG. 5 illustrates a call flow diagram of a method for implementing a handover from a 4G eNodeB to a 5G gNodeB, according to an example embodiment.

FIG. 5 illustrates a call flow diagram of an example method 500 for implementing a handover from eNodeB 120 to gNodeB 160. Method 500 may occur after method 400, that is, after the initial 4G PDN connection has been successfully established in EPS and SMF+PGW-C 402 stores the one or more QoS parameters corresponding to the 5G telecommunications technology. At operation 502, eNodeB 120 initiates a handover procedure and MME 135 obtains an indication from eNodeB 120 that a handover is required. At operation 504, AMF 140 obtains a forward relocation request from MME 135. At operation 506, SMF+PGW-C 402 obtains, from AMF 140, a request for the one or more stored QoS parameters corresponding to the 5G telecommunications technology (e.g., an NSmf PDU session SM context request that requests SMF+PGW-C 402 to create context for UE 105 in 5G).

At operation 508, during the handover procedure from the 4G telecommunications technology to the 5G telecommunications technology, SMF+PGW-C 402 allocates the one or more stored QoS parameters corresponding to the 5G telecommunications technology. For example, SMF+PGW-C 402 may provide, to UPF+PGW-U 404, the one or more stored QoS parameters corresponding to the 5G telecommunications technology. The one or more stored QoS parameters corresponding to the 5G telecommunications technology may be included (e.g., embedded) in an exchange of N4 session modification messages (e.g., an N4 session modification request) between SMF+PGW-C 402 and UPF+PGW-U 404 that informs UPF+PGW-U 404 of the handover. Conventionally, SMF+PGW-C 402 would not store the one or more QoS parameters corresponding to the 5G telecommunications technology, and as such would provide the one or more QoS parameters corresponding to the 4G telecommunications technology instead of the one or more stored QoS parameters corresponding to the 5G telecommunications technology. The signaling toward UPF+PGW-U 404 may be optimized whereby SMF+PGW-C 402 may send both data path and QoS updates in the same PFCP session update request/response exchange.

At operation 510, during the handover procedure from the 4G telecommunications technology to the 5G telecommunications technology, SMF+PGW-C 402 further allocates the one or more stored QoS parameters corresponding to the 5G telecommunications technology. For example, SMF+PGW-C 402 may provide, to AMF 140, the one or more stored QoS parameters corresponding to the 5G telecommunications technology. The one or more stored QoS parameters corresponding to the 5G telecommunications technology may be included (e.g., embedded) in a create context response (e.g., an NSmf PDU session SM context response). At operation 512, AMF 140 provides, to gNodeB 160, the one or more stored QoS parameters corresponding to the 5G telecommunications technology. The one or more stored QoS parameters corresponding to the 5G telecommunications technology may be included (e.g., embedded) in a handover request that initiates a flow creation in 5G. Thus, SMF 145 may allocate the one or more stored parameters corresponding to the 4G telecommunications technology by providing (directly or indirectly) the one or more stored parameters corresponding to the 4G telecommunications technology to one or more network entities comprising a data plane (e.g., UPF+PGW-U 404 and gNodeB 160).

At operation 514, AMF 140 obtains, from gNodeB 160, a handover request acknowledgment indicating that gNodeB 160 has successfully accepted the one or more stored QoS parameters corresponding to the 5G telecommunications technology. Conventionally, AMF 140 would provide the one or more QoS parameters corresponding to the 4G telecommunications technology for gNodeB 160 to use. After the user has been provided with substandard capabilities of 4G over the 5G network for some period of time, system 100 would utilize the aforementioned excessive signaling to derive 5G QoS parameters from the one or more QoS parameters corresponding to the 4G telecommunications technology and then allocate those 5G QoS parameters. The techniques described herein may avoid these issues because gNodeB 160 successfully accepts the one or more stored QoS parameters corresponding to the 5G telecommunications technology.

At operation 518, SMF+PGW-C 402 obtains, from AMF 140, an NSmf PDU session update SM context request. At operation 520, SMF+PGW-C 402 exchanges further N4 session modification messages with UPF+PGW-U 404. At operation 522, SMF 145 provides a PDU session update SM context response to AMF 140. At operation 524, AMF 140 provides a forward relocation response to MME 135. At operation 526, MME 135 provides, to SGW 125, a create indirect data forwarding tunnel request. The create indirect data forwarding tunnel request may include uplink indirect data forwarding tunnel information for UPF+PGW-U 404 obtained from operation 524 (and operation 522). At operation 528, MME 135 obtains, from SGW 125, a create indirect data forwarding tunnel response that includes uplink indirect data forwarding tunnel information for SGW 125. At operation 530, MME 135 provides a handover command to eNodeB 120. At operation 532, eNodeB 120 provides a command to UE 105 to handover from eNodeB 120. At operation 534, UE 105 provides, to gNodeB 160, an indication that UE 105 is handing over to gNodeB 160. Thus, uplink user plane PDU transmission via 5G is now available. Any remaining operations may be successfully and efficiently performed.

Thus, as illustrated in FIGS. 4 and 5, SMF 145 may fetch 5G QoS flow parameters during 4G PDN connection establishment and store them for use during a 4G-to-5G handover. In one example, SMF+PGW-C 402 may obtain 5G QoS parameters from PCF 155 and provide the 5G QoS parameters to AMF 140 as part of an SM context update request. During handover from eNodeB 120 to gNodeB 160, SMF+PGW-C 402 may provide the 5G QoS parameters to AMF 140, which in turn passes the 5G QoS parameters to gNodeB 160. SMF+PGW-C 402 may also inform UPF+PGW-U 404 of the 5G QoS parameters during session modification for creating an N3 tunnel in 5G. In one example, a Protocol Configuration Options (PCO) field in the create bearer request may include the 5G QoS parameters. SMF+PGW-C 402 may provide the 5G QoS parameters in the extended PCO toward UE 105 to assist UE 105 in moving from eNodeB 120 (4G) to gNodeB 160 (5G), so that UE 105 has the correct 5G QoS flow parameters during the 4G-to-5G handover. As a result, the handover from eNodeB 120 to gNodeB 160 automatically provisions QoS enforcement and succeeds with acceptable parameters for 5G radio capabilities, thereby allowing the user to enjoy fully 5G-capable bandwidth and QoS enforcement.

Figure 6:
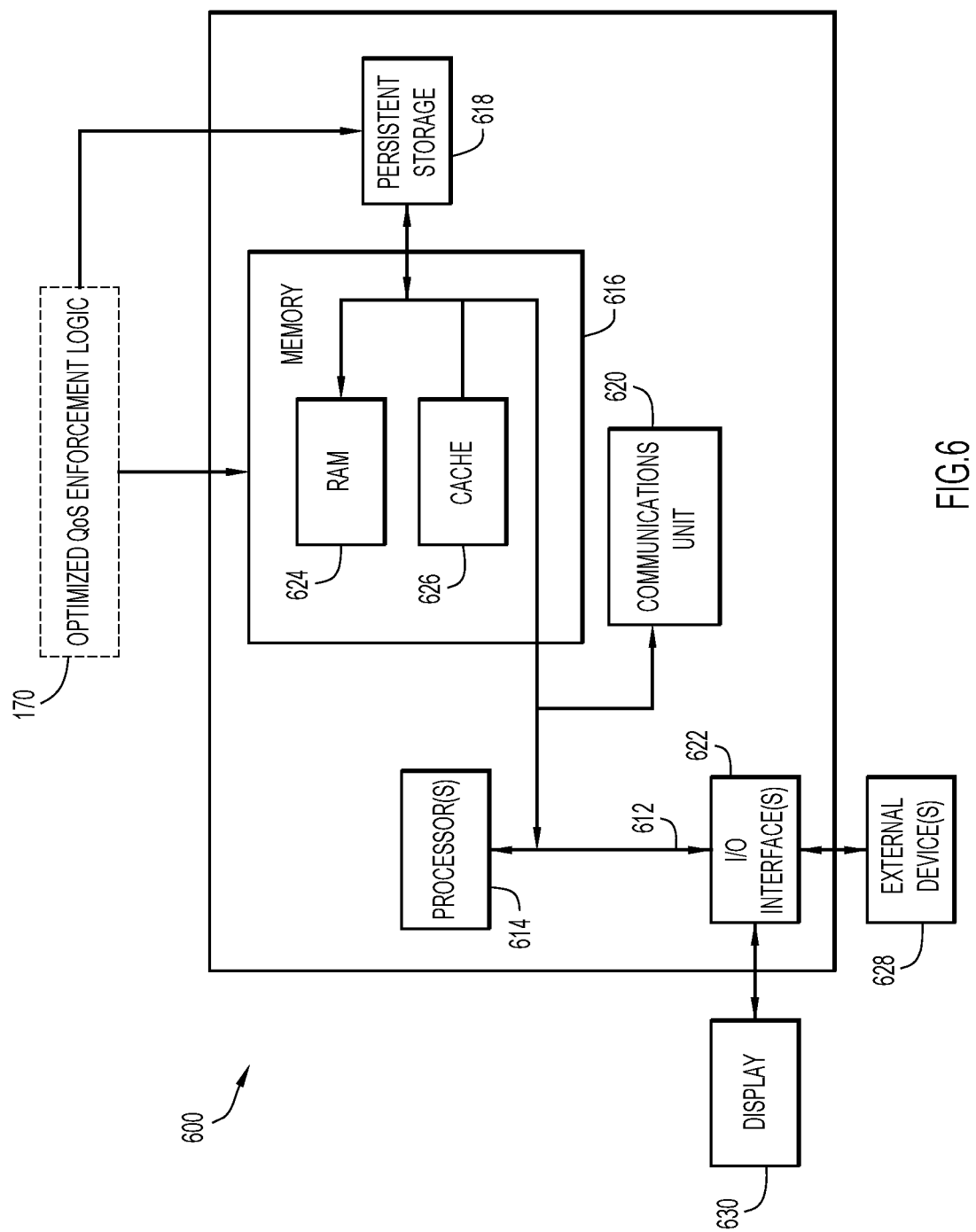
FIG. 6 illustrates a block diagram of a computing device configured to optimized QoS enforcement for handovers between different RATs, according to an example embodiment.

FIG. 6 illustrates a hardware block diagram of an example device 600 (e.g., computing device, such as SMF 145 and/or SMF+PGW-C 402). It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and Input/Output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes Random Access Memory (RAM) 624 and cache memory 626. In general, memory 616 can include any suitable volatile or non-volatile computer readable storage media. Instructions for Optimized QoS enforcement logic 170 may be stored in memory 616 or persistent storage 618 for execution by computer processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to device 600. For example, I/O interface(s) 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

Figure 7:
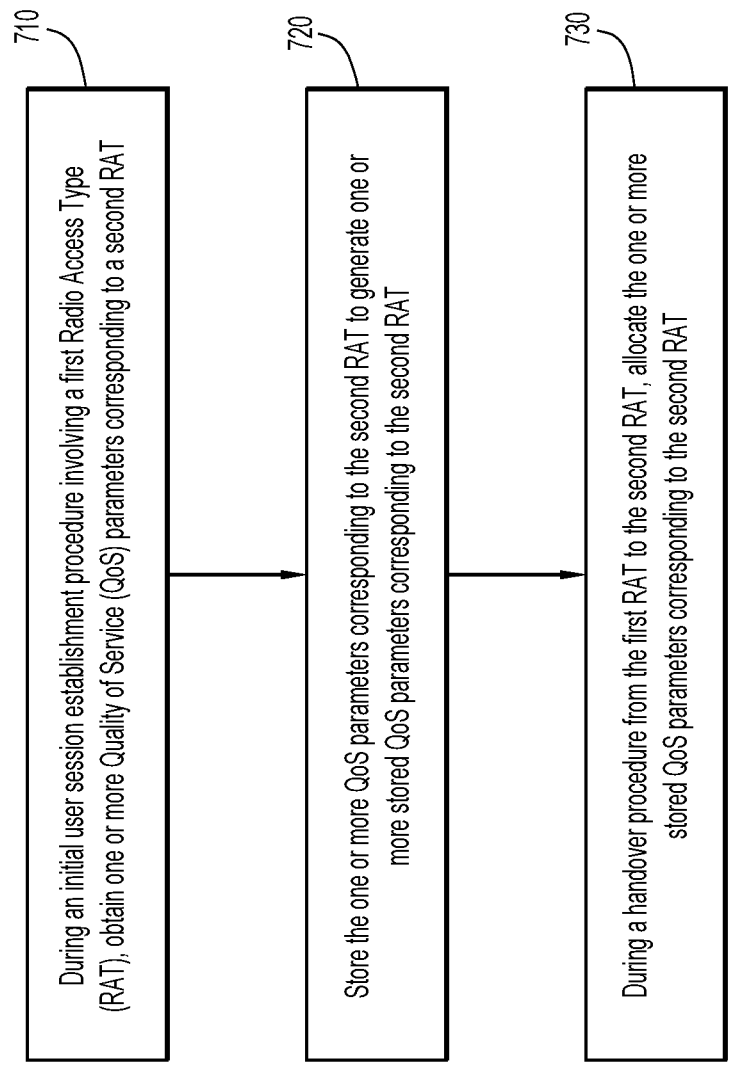
FIG. 7 illustrates a flowchart of a method for optimizing QoS enforcement for handovers between different RATs, according to an example embodiment.

With continued reference to FIG. 6, FIG. 7 is a flowchart of an example method 700 for optimizing QoS enforcement for handovers between different RATs. At operation 710, during an initial user session establishment procedure involving a first RAT, device 600 obtains one or more QoS parameters corresponding to a second RAT. At operation 720, device 600 stores the one or more QoS parameters corresponding to the second RAT to generate one or more stored QoS parameters corresponding to the second RAT. At operation 730, during a handover procedure from the first RAT to the second RAT, device 600 allocates the one or more stored QoS parameters corresponding to the second RAT.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: during an initial user session establishment procedure involving a first RAT, obtaining one or more QoS parameters corresponding to a second RAT; storing the one or more QoS parameters corresponding to the second RAT to generate one or more stored QoS parameters corresponding to the second RAT; and during a handover procedure from the first RAT to the second RAT, allocating the one or more stored QoS parameters corresponding to the second RAT.

In one example, the method further comprises: obtaining an indication of the initial user session establishment procedure; and in response to obtaining the indication of the initial user session establishment procedure, requesting the one or more QoS parameters corresponding to the second RAT; wherein obtaining the one or more QoS parameters corresponding to the second RAT includes obtaining the one or more QoS parameters corresponding to the second RAT in response to requesting the one or more QoS parameters corresponding to the second RAT.

In a further example, the method further comprises: providing a request for subscription information; and in response to providing the request for the subscription information, obtaining the subscription information, wherein requesting the one or more QoS parameters corresponding to the second RAT includes requesting the one or more QoS parameters corresponding to the second RAT based on the subscription information.

In one example, allocating the one or more stored QoS parameters corresponding to the second RAT includes providing the one or more stored QoS parameters corresponding to the second RAT to one or more network entities comprising a data plane.

In one example, the one or more QoS parameters include one or more bandwidth parameters.

In one example, the first RAT includes fourth-generation telecommunications technology, and the second RAT includes fifth-generation telecommunications technology In one example, the first RAT includes fifth-generation telecommunications technology, and the second RAT includes fourth-generation telecommunications technology.

In another form, an apparatus is provided. The apparatus comprises: a network interface configured to obtain or provide network communications; and one or more processors coupled to the network interface, wherein the one or more processors are configured to: during an initial user session establishment procedure involving a first RAT, obtain one or more QoS parameters corresponding to a second RAT; store the one or more QoS parameters corresponding to the second RAT to generate one or more stored QoS parameters corresponding to the second RAT; and during a handover procedure from the first RAT to the second RAT, allocate the one or more stored QoS parameters corresponding to the second RAT.

In another form, one or more non-transitory computer readable storage media are provided. The non-transitory computer readable storage media are encoded with instructions that, when executed by a processor, cause the processor to: during an initial user session establishment procedure involving a first Radio Access Type (RAT), obtain one or more Quality of Service (QoS) parameters corresponding to a second RAT; store the one or more QoS parameters corresponding to the second RAT to generate one or more stored QoS parameters corresponding to the second RAT; and during a handover procedure from the first RAT to the second RAT, allocate the one or more stored QoS parameters corresponding to the second RAT.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
in response to obtaining an indication of an initial user session establishment procedure involving a first Radio Access Type (RAT), requesting one or more Quality of Service (QoS) parameters corresponding to a second RAT;
during the initial user session establishment procedure, obtaining the one or more QoS parameters corresponding to the second RAT;
storing the one or more QoS parameters corresponding to the second RAT to generate one or more stored QoS parameters corresponding to the second RAT; and
during a handover procedure from the first RAT to the second RAT, allocating the one or more stored QoS parameters corresponding to the second RAT.

2. The method of claim 1, further comprising:
obtaining the indication of the initial user session establishment procedure,
wherein obtaining the one or more QoS parameters corresponding to the second RAT includes obtaining the one or more QoS parameters corresponding to the second RAT in response to requesting the one or more QoS parameters corresponding to the second RAT.

3. The method of claim 1, further comprising:
providing a request for subscription information; and
in response to providing the request for the subscription information, obtaining the subscription information,
wherein
requesting the one or more QoS parameters corresponding to the second RAT includes requesting the one or more QoS parameters corresponding to the second RAT based on the subscription information.

4. The method of claim 1, wherein allocating the one or more stored QoS parameters corresponding to the second RAT includes providing the one or more stored QoS parameters corresponding to the second RAT to one or more network entities comprising a data plane.

5. The method of claim 1, wherein the one or more QoS parameters include one or more bandwidth parameters.

6. The method of claim 1, wherein the first RAT includes fourth-generation telecommunications technology, and the second RAT includes fifth-generation telecommunications technology.

7. The method of claim 1, wherein the first RAT includes fifth-generation telecommunications technology, and the second RAT includes fourth-generation telecommunications technology.

8. An apparatus comprising:
a network interface configured to obtain or provide network communications; and
one or more processors coupled to the network interface, wherein the one or more processors are configured to:
in response to obtaining an indication of an initial user session establishment procedure involving a first Radio Access Type (RAT), request one or more Quality of Service (QoS) parameters corresponding to a second RAT;
during the initial user session establishment procedure, obtain the one or more QoS parameters corresponding to the second RAT;
store the one or more QoS parameters corresponding to the second RAT to generate one or more stored QoS parameters corresponding to the second RAT; and
during a handover procedure from the first RAT to the second RAT, allocate the one or more stored QoS parameters corresponding to the second RAT.

9. The apparatus of claim 8, wherein the one or more processors are further configured to:
obtain the indication of the initial user session establishment procedure;
and
obtain the one or more QoS parameters corresponding to the second RAT in response to requesting the one or more QoS parameters corresponding to the second RAT.

10. The apparatus of claim 8, wherein the one or more processors are further configured to:
provide a request for subscription information;
in response to providing the request for the subscription information, obtain the subscription information; and
request the one or more QoS parameters corresponding to the second RAT based on the subscription information.

11. The apparatus of claim 8, wherein the one or more processors are further configured to:
provide the one or more stored QoS parameters corresponding to the second RAT to one or more network entities comprising a data plane.

12. The apparatus of claim 8, wherein the one or more QoS parameters include one or more bandwidth parameters.

13. The apparatus of claim 8, wherein the first RAT includes fourth-generation telecommunications technology, and the second RAT includes fifth-generation telecommunications technology.

14. The apparatus of claim 8, wherein the first RAT includes fifth-generation telecommunications technology, and the second RAT includes fourth-generation telecommunications technology.

15. One or more non-transitory computer readable storage media encoded with instructions that, when executed by a processor, cause the processor to:
in response to obtaining an indication of an initial user session establishment procedure involving a first Radio Access Type (RAT), request one or more Quality of Service (QoS) parameters corresponding to a second RAT;

during the initial user session establishment procedure, obtain the one or more QoS parameters corresponding to the second RAT;

store the one or more QoS parameters corresponding to the second RAT to generate one or more stored QoS parameters corresponding to the second RAT; and during a handover procedure from the first RAT to the second RAT, allocate the one or more stored QoS parameters corresponding to the second RAT.

16. The one or more non-transitory computer readable storage media of claim 15, wherein the instructions further cause the processor to:

obtain the indication of the initial user session establishment procedure;

and obtain the one or more QoS parameters corresponding to the second RAT in response to requesting the one or more QoS parameters corresponding to the second RAT.

17. The one or more non-transitory computer readable storage media of claim 15, wherein the instructions further cause the processor to:

provide a request for subscription information;

in response to providing the request for the subscription information, obtain the subscription information; and request the one or more QoS parameters corresponding to the second RAT based on the subscription information.

18. The one or more non-transitory computer readable storage media of claim 15, wherein the instructions further cause the processor to:

provide the one or more stored QoS parameters corresponding to the second RAT to one or more network entities comprising a data plane.

19. The one or more non-transitory computer readable storage media of claim 15, wherein the one or more QoS parameters include one or more bandwidth parameters.

20. The one or more non-transitory computer readable storage media of claim 15, wherein:

the first RAT includes fourth-generation telecommunications technology, and the second RAT includes fifth-generation telecommunications technology; or the first RAT includes the fifth-generation telecommunications technology, and the second RAT includes the fourth-generation telecommunications technology.

* * * * *